United States Patent
Carbone et al.

(10) Patent No.: US 11,358,496 B2
(45) Date of Patent: Jun. 14, 2022

(54) MOBILE FRAME FOR SEATS AND RELATIVE SLIDING SEATS SYSTEM

(71) Applicant: LAZZERINI SOCIETA' A RESPONSABILITA' LIMITATA, Monsano (IT)

(72) Inventors: Innocenzo Carbone, Santa Maria Nuova (IT); Sandro Guidoni, Senigallia (IT)

( * ) Notice: Subject to any disclaimer, the term of this patent is extended or adjusted under 35 U.S.C. 154(b) by 269 days.

(21) Appl. No.: 16/558,731

(22) Filed: Sep. 3, 2019

(65) Prior Publication Data

US 2020/0079244 A1    Mar. 12, 2020

(30) Foreign Application Priority Data

Sep. 7, 2018 (IT) .................. 102018000008432

(51) Int. Cl.
  *B60N 2/08* (2006.01)
  *B60N 2/07* (2006.01)
  *B60N 2/06* (2006.01)

(52) U.S. Cl.
  CPC ............ *B60N 2/0722* (2013.01); *B60N 2/06* (2013.01); *B60N 2/08* (2013.01); *B60N 2/0868* (2013.01)

(58) Field of Classification Search
  CPC ...... B60N 2/0722; B60N 2/08; B60N 2/0868; B60N 2/0862; B60N 2/067; B60N 2/062; B60N 2/0232; B60N 2/06; B60N 2/0726; B60N 2002/0236
  USPC ................. 248/424, 428, 429, 430
  See application file for complete search history.

(56) References Cited

U.S. PATENT DOCUMENTS

| | | | |
|---|---|---|---|
| 6,488,249 B1 | 12/2002 | Girardi et al. | |
| 6,935,691 B1* | 8/2005 | Sasaki | B60N 2/0812 248/421 |
| 9,393,890 B2* | 7/2016 | Phinney | B60N 2/01516 |
| 10,308,145 B2* | 6/2019 | Cziomer | B60N 2/085 |
| 2011/0241401 A1* | 10/2011 | Otsuka | B60N 2/3013 297/331 |
| 2016/0264023 A1 | 9/2016 | Mill | |

FOREIGN PATENT DOCUMENTS

DE    19638001 C1    4/1998

OTHER PUBLICATIONS

Search Report Form IT237 "Written Opinion" dated May 9, 2019 with reference to the Italian Patent Application No. IT 102018000008432.

* cited by examiner

*Primary Examiner* — Nkeisha Smith
(74) *Attorney, Agent, or Firm* — Egbert, McDaniel & Swartz, PLLC

(57) ABSTRACT

A mobile frame for at least one seat of a means of transportation is disclosed. The mobile frame includes: a load-bearing structure suitable for supporting the seat, and an anchoring element coupled with the load-bearing structure to selectively constrain the mobile frame to the support surface of the transportation means. The anchoring element has a fixing mechanism that can be moved from a non-anchored configuration, wherein at least one fixing element is retracted inside the load-bearing structure to an anchored configuration, wherein the fixing element protrudes beyond the load-bearing structure in order to constrain the mobile frame to the support surface.

8 Claims, 6 Drawing Sheets

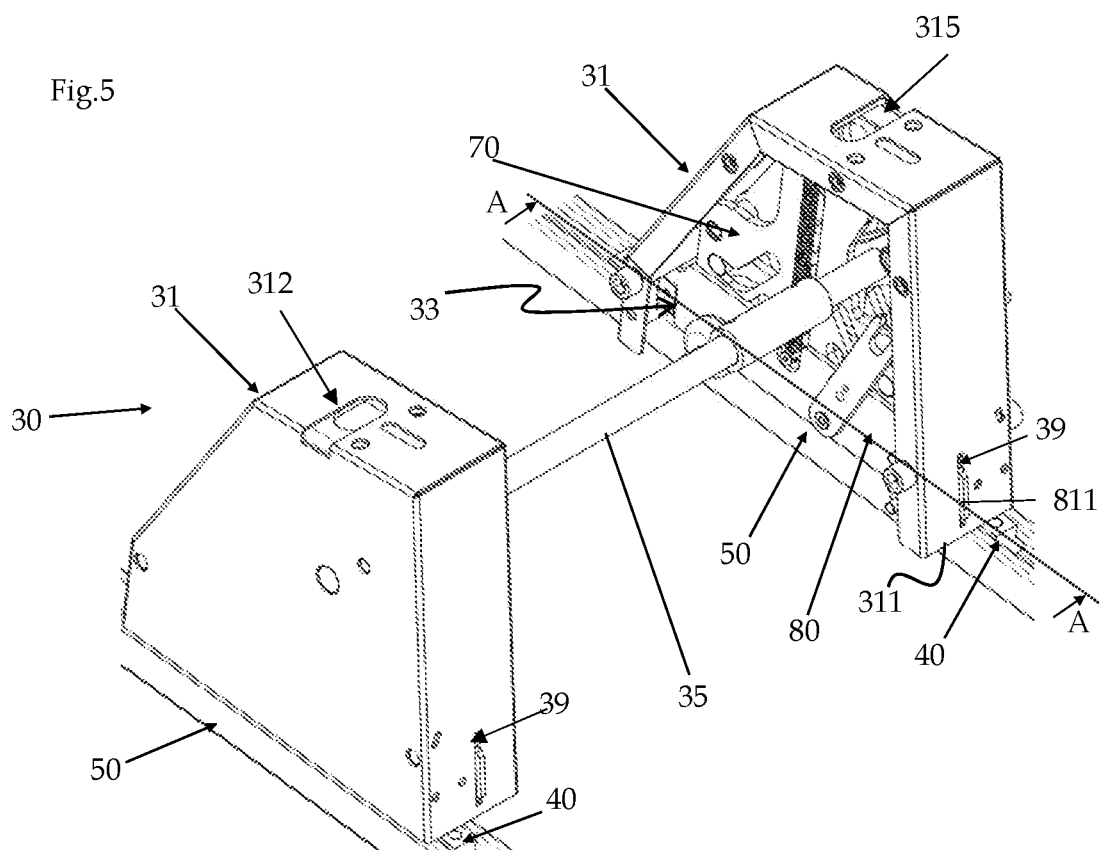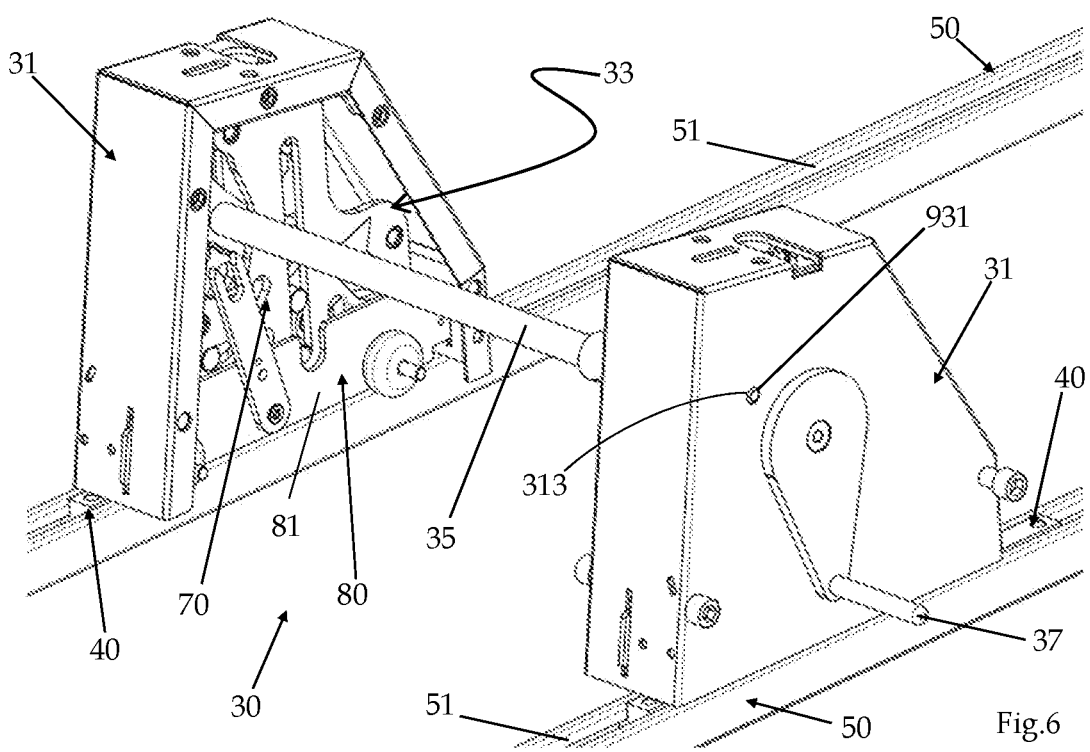

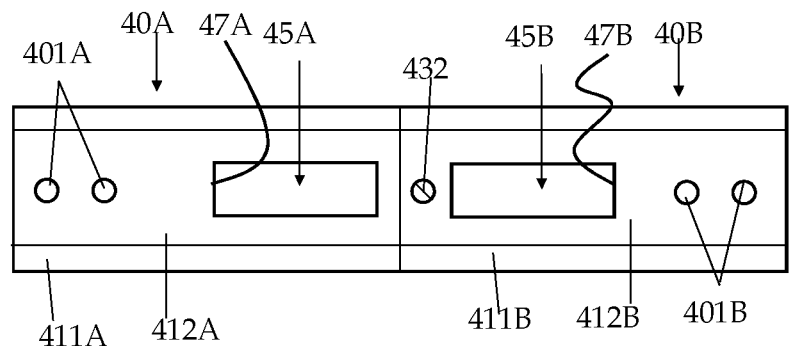
Fig.11
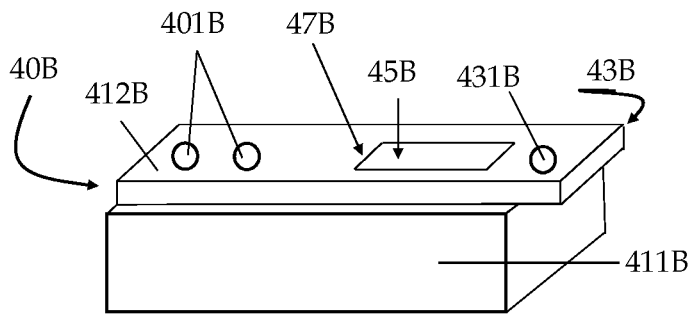
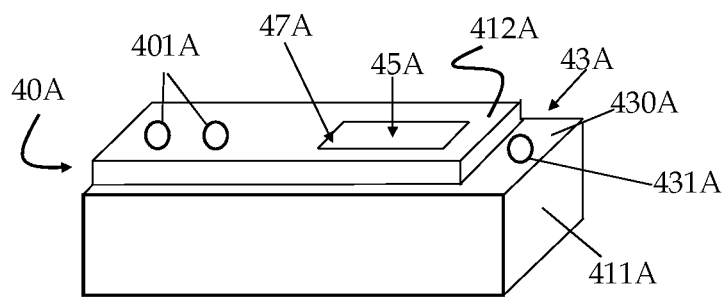
Fig.12
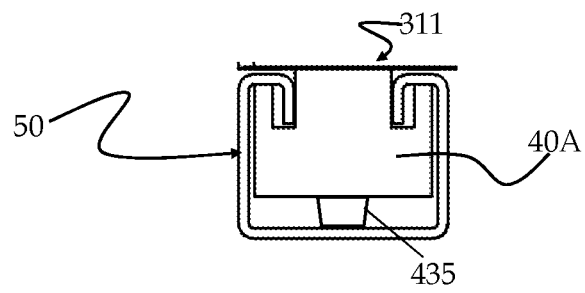
Fig.13

MOBILE FRAME FOR SEATS AND RELATIVE SLIDING SEATS SYSTEM

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to means of transportation, namely to a sliding frame for seats and to a relative sliding seats system.

2. Description of Related Art Including Information Disclosed Under 37 CFR 1.97 and 37 CFR 1.98

Means of transportation for persons, such as cars, buses, aircrafts, and the like, comprise a plurality of seats for the transportation of passengers, which are typically disposed in parallel rows, each seat being disposed at a preset distance from a front and/or back seat. Consequently, the use of the space inside transportation means is determined by the arrangement and the quantity of the seats.

In view of the above, the use of means of transportation may be difficult for disabled users, especially in presence of walking aids, such as wheelchairs.

According to the prior art, a portion of the means of transportation is dedicated to such a type of users. However, such an arrangement reduces the number of seats that can be installed on the means of transportation.

BRIEF SUMMARY OF THE INVENTION

The purpose of the present invention is to overcome the aforementioned drawbacks.

In particular, the purpose of the present invention is to disclose a frame for seats that can be easily moved between two positions and that can firmly hold the seats when they are used by passengers.

Another purpose of the present invention is to disclose a seats system that permits to change the arrangement of the seats, in such a way to use the space available in a means of transportation at best.

These purposes, together with additional purposes, are achieved according to the invention with the characteristics of the independent claims.

Advantageous embodiments of the invention appear from the dependent claims.

BRIEF DESCRIPTION OF THE SEVERAL VIEWS OF THE DRAWINGS

Additional features of the invention will appear clearer from the following detailed description, which refers to merely illustrative, not limiting embodiments, wherein:

FIGS. 5 and 6 are axonometric views of a sliding frame for seats according to an embodiment of the present invention;

FIG. 11 illustrates two housing elements, in coupling mode, which permit the anchoring of the mobile frame in a preset position;

FIG. 12 illustrates the two housing elements of FIG. 11 separately, and

FIG. 13 is a sectional view of the constraint bars where the mobile frame of the system of FIG. 1 is mounted.

DETAILED DESCRIPTION OF THE INVENTION

Figure 1:
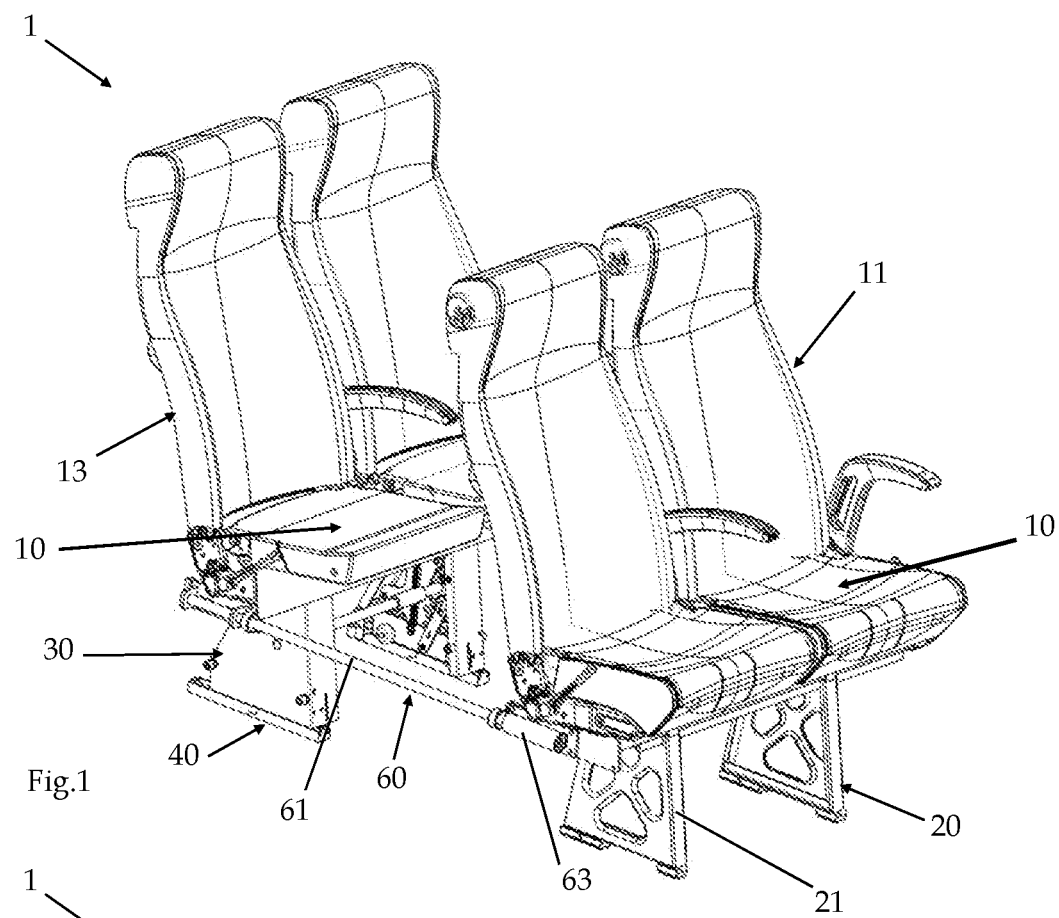
FIG. 1 is an axonometric view of a seats system according to an embodiment of the present invention.

With reference to the FIGS. 1 to 4, a seats system (1) according to an embodiment of the present invention is disclosed.

In the example, the system (1) comprises four seats disposed two by two in adjacent position, forming a pair of front seats (11) and a pair of back seats (13). The pair of front seats (11) is mounted on a fixed frame (20), whereas the pair of back seats (13) is mounted on a mobile frame (30). Preferably, at least the seats (10) of the pair of back seats (13) comprise a folding seat, which is suitable for passing from a sitting position, in transverse direction relative to a backrest of the seat, to a closed position, which is substantially parallel to the backrest.

Figure 2:
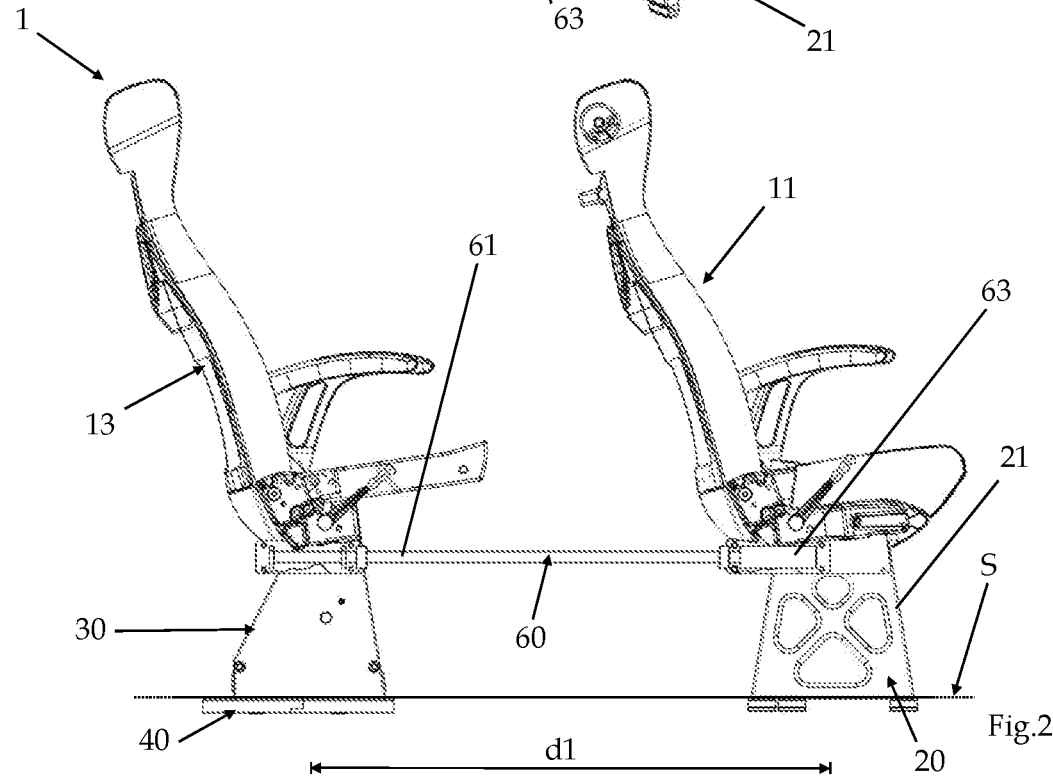
FIG. 2 is a side view of the seats system of FIG. 1.
Figure 3:
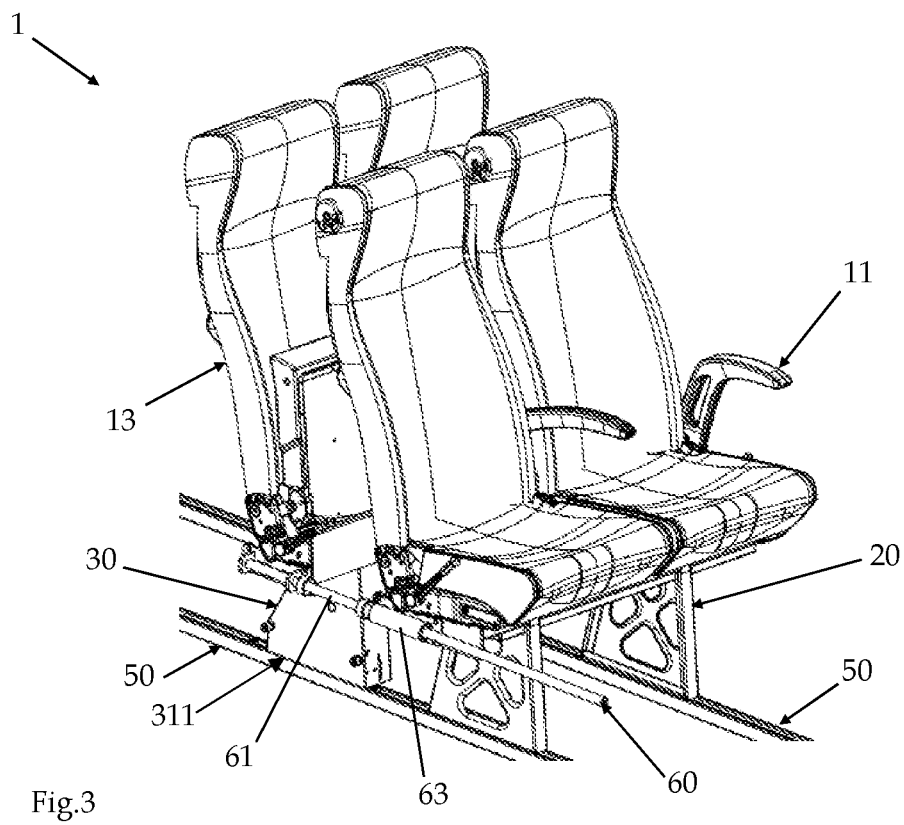
FIG. 3 is an axonometric view of the sliding seats system of FIG. 1 according to a second configuration of use.
Figure 4:
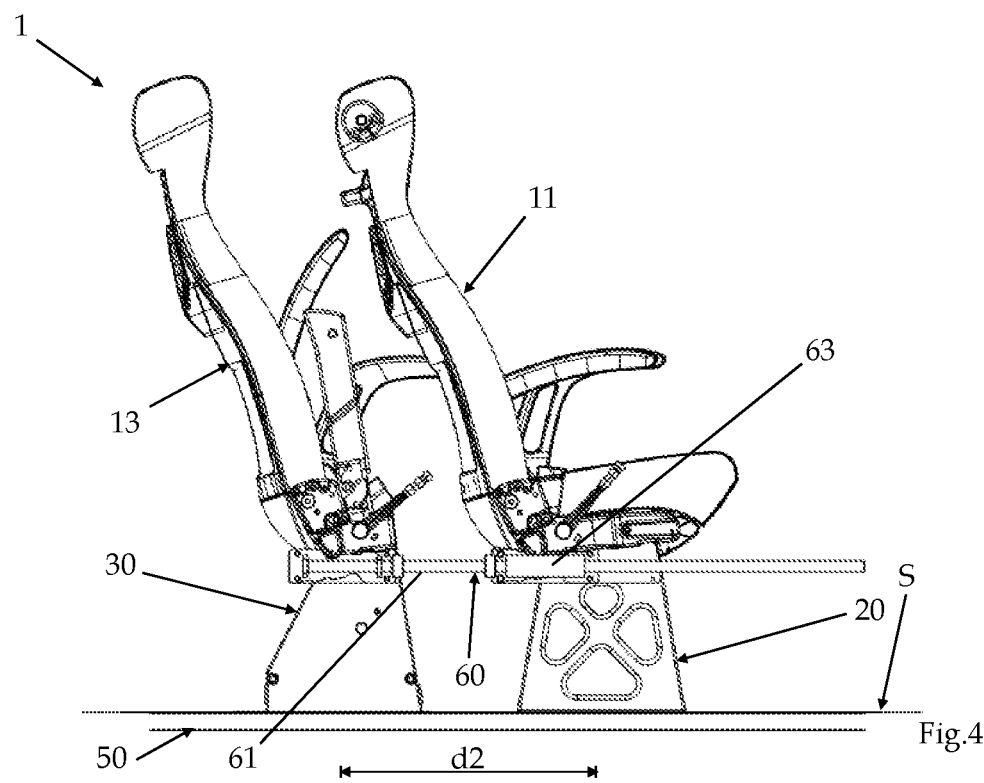
FIG. 4 is a side view of the sliding seats system of FIG. 3.

According to the embodiments of the present invention, the mobile frame (30) is designed to move, together with the pair of back seats (13), from a first position, which corresponds to a first configuration of use of the system (1)—as illustrated in FIGS. 1 and 2—to a second position, which corresponds to a second configuration of the system—as illustrated in FIGS. 3 and 4. In particular, in the first position, the mobile frame (30) is disposed at a first distance (d1) from the fixed frame (20) that allows for using the pair of back seats (13). On the contrary, in the second position, the mobile frame (30) is disposed at a second distance (d2) from the fixed frame (20), said second distance (d2) being lower than the first distance (d1) (d2<d1). In the second position, the volume of the system (1) is reduced, thus increasing the free space available in a means of transportation where the system (1) is installed.

Getting in further detail, the fixed frame (20) comprises a pair of supports (21) for the separation from a support surface (S), such as for instance the platform of the means of transportation. In the non-limiting example of FIGS. 1 and 2, each support (21) has a plate-like structure with trapezoidal profile and transverse development relative to the support surface. One end of the support (21), which corresponds to the major base of the trapezium, is joined with the support surface (S), whereas the opposite end, which corresponds to the minor base of the trapezium, is coupled with a fixing bar (not shown in the figures) in transverse direction relative to the supports (21) and where the seats (10) of the pair of front seats (11) are mounted.

In the example of FIGS. 5 to 10, the mobile frame (30) comprises a pair of bodies (31) suitable for enclosing an anchoring element, at least partially. Each body (31) of the mobile frame (30) comprises a box body that defines a supporting edge (311) suitable for coming in contact with the support surface (S).

The mobile frame (30) comprises a drive shaft (35) coupled with the anchoring elements (33) in such a way to transmit a rotatory motion imposed by an actuation element, which consists in a crank (37) is this illustrative embodiment. The crank (37) is coupled at one end of the drive shaft (35) protruding from a body (31), in such a way to be easily accessed by an operator (not shown).

Advantageously, the drive shaft (35) may comprise an actuation or assisted-actuation element, such as an electric motor. For example, the drive shaft (35) comprises a pair of rods that are joined by a sleeve (351) that contains the electric motor, which is operatively connected to corresponding ends of the rods of the drive shaft (35).

In the example, each anchoring element (33) comprises a fixing mechanism (70) and a drive mechanism (80) that are actuated by a lever (90). The fixing mechanism (70) comprises a pair of fixing elements (71), which are visible in FIGS. 7 and 8, to constrain the mobile frame (30) to housing elements (40A, 40B) of the system (1) or, more generally, to the support surface (S). Each fixing element (71) comprises a plate-like body provided with a hook end (711) and at least one through hole (two holes in the example).

Four articulation arms (73) are provided inside each body (31) of the mobile frame (30), each of them being hinged to a corresponding fixing element (71) by means of a first end and to a slide (75) by means of a second end. Preferably, pairs of articulation arms (73) are disposed in parallel position and symmetrically relative to the slide (75) and to the fixing element (71).

Figure 7:
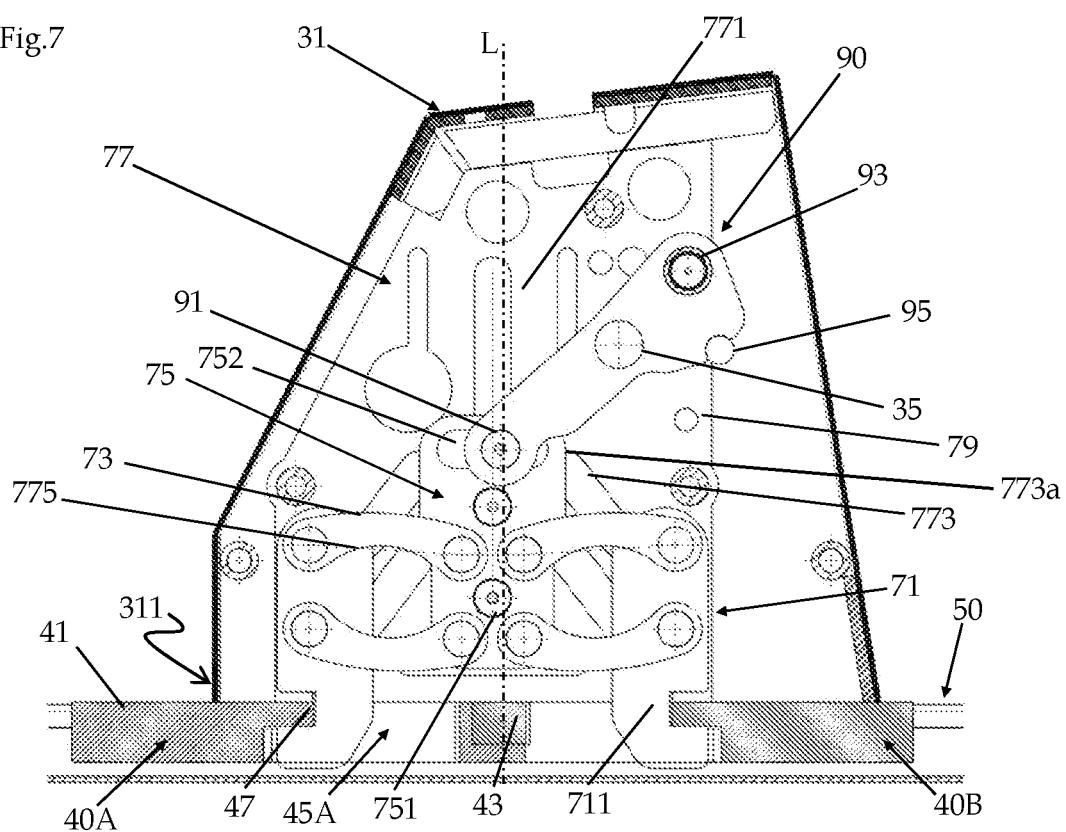
FIG. 7 is a sectional side view taken along the axis A-A, with omitted components, of a sliding support of the frame of FIG. 6 with un engagement pin in an anchored position.
Figure 8:
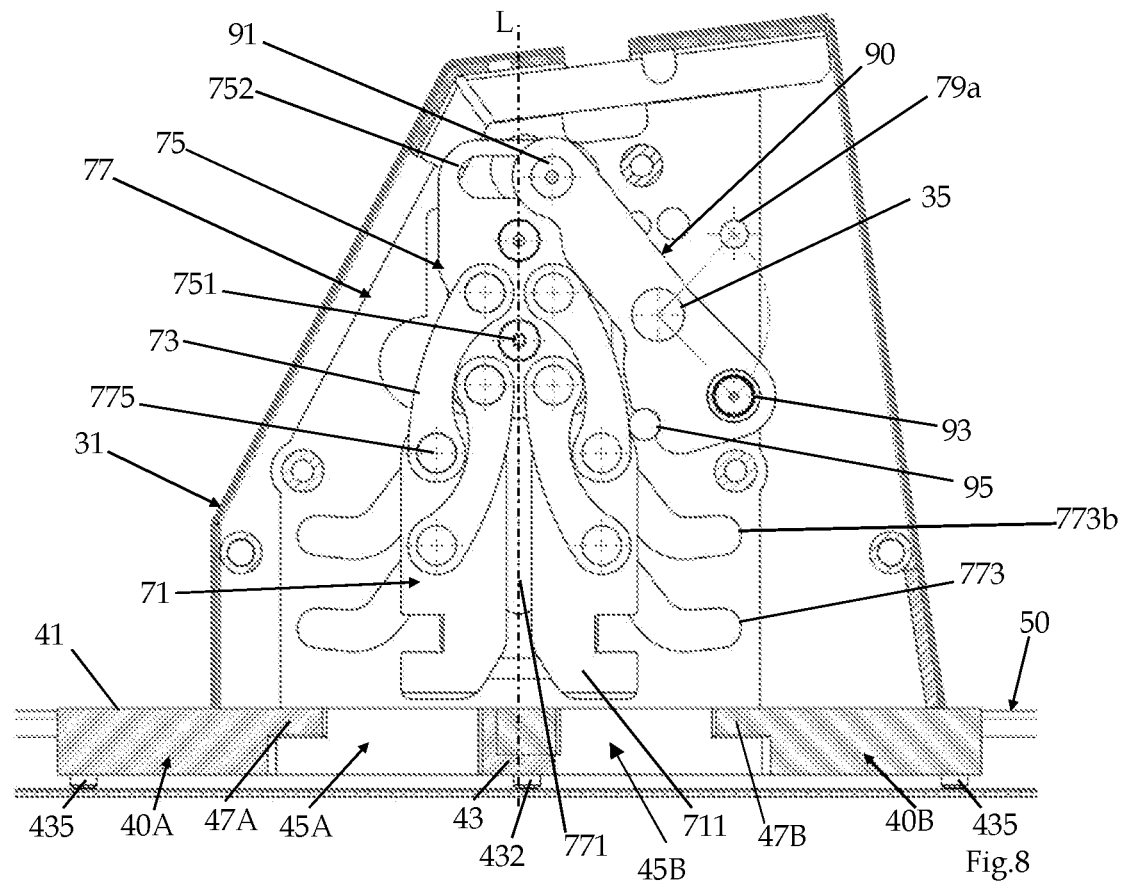
FIG. 8 is a sectional side view taken along the axis A-A, with omitted components, of the sliding support of FIG. 7 with the engagement pin in a nonanchored position.

In particular, the fixing elements (71) are disposed symmetrically relative to the slide (75) on the same plane where the slide (75) lies. The fixing elements (71) are articulated to the slide (75) in such a way that the concave portions of the hook ends (711) of the two fixing elements (71) are directed in opposite direction relative to the slide (75), as shown in FIGS. 7 and 8.

The slide (75) comprises a plate-like body provided with a plurality of holes that are suitable for receiving a pin. Each articulation arm (73) is hinged to the slide (75) by means of the pin. Preferably, the articulation arms (73) in parallel position at opposite sides of the slide (75) are coupled to the same pin.

The slide (75) also comprises at least on additional through hole (two in the example of the figures) to receive a sliding pin (751). Moreover, the slide (75) comprises a groove (752), which is preferably formed at one end of the body of the slide (75), where the lever (90) is slidingly coupled. In the example, the groove (752) is configured in such a way to be substantially transverse to the supporting edge (311) of the body (31) and consequently to the support surface (S) when the mobile frame is in operating position.

The fixing mechanism (70) also comprises two guide plates (77).

Each guide plate (77) comprises a first guide groove (771) suitable for slidingly receiving two sliding pins (751) of the slide (75), and second guide grooves (773), preferably a pair of second guide grooves (773) for each fixing element (71), which slidingly receive a sliding pin (775) of the fixing element (71). In the example, the sliding pins (775) of the fixing elements (71) correspond to the pins that are used to hinge the articulation arms (73) to the fixing elements (71). However, according to other embodiments the sliding pins of the fixing elements are different from the pins that are used to hinge the articulation arms to the fixing elements.

More precisely, the first guide groove (711) develops along a longitudinal axis (L) that is transverse to the support surface (S) when the mobile frame (30) is installed.

The second guide grooves (773) are formed in symmetric position relative to the longitudinal axis (L) at the opposite sides of the first guide groove (771).

Each second guide groove (773) defines a trajectory that follows an inclined curve, or a broken line, from a first end (773a) in distal position from the first guide groove (771) and in proximal position to the supporting edge (311) of the body (31), to a second end (773b) in proximal position to the first guide groove (771) and in distal position from the supporting edge (311).

The two guide plates (77) are disposed in parallel position relative to the longitudinal axis (L), in such a way to define a gap that is suitable for receiving the fixing elements (71), the articulation arms (73), the slide(75) and the lever (90) in coupled mode.

Moreover, the two guide plates are disposed in such a way that each first guide groove (771) and each second guide groove (773) of one of the two guide plates (77) is aligned to a corresponding groove of the other guide plate (77). In view of the above, the sliding pins that are coupled with the fixing elements (71), with the articulation arms (73) and with the slide (75) pass through the gap and are received by a pair of first (771) or second (773) guide grooves of the two guide plates (77).

Figure 10:
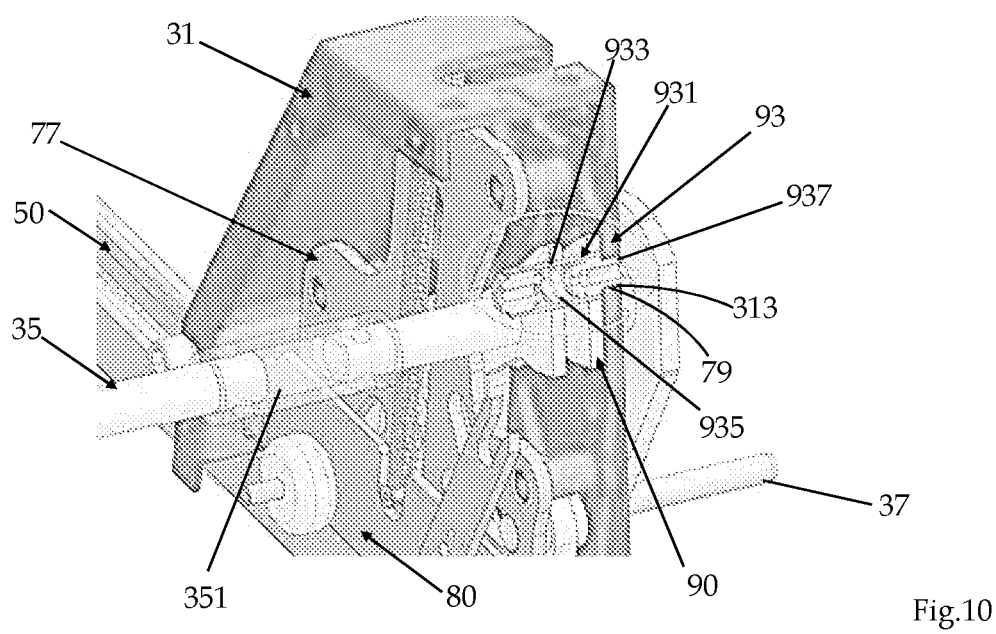
FIG. 10 is an axonometric view of the frame, with omitted components, which illustrates a sectional view of a lock system suitable for locking the engagement pin in the anchored position.

The lever (90) comprises at least one plate-like elongated body, wherein a first end is slidingly coupled with the slide (75). Namely, the first end comprises a through hole suitable for receiving a sliding pin (91) that is slidingly received in the groove (752) of the slide (75). According to a preferred embodiment, as shown in FIG. 10, the lever (90) comprises a pair of plate-like bodies in parallel position and coupled at opposite ends of the sliding pin (91) in such a way to define a space suitable for receiving the slide (75).

The lever (90) is hinged to the drive shaft (35), which penetrates a through hole of the lever (90) formed in the body of the lever (90) at a suitable distance from the sliding pin (91) to define a lever arm with the desired length.

A lock system (93) is disposed at a second end of the lever (90), opposite to the first end, said lock system (93) being suitable for cooperating with corresponding end stops, namely a first stop hole (79) and a second stop hole (79a) formed in the guide plate (77) in the example, which are suitably disposed to define a commutation angle with a preset width, for example 90°, centered in the drive shaft (35). The lock system (93) limits a rotation of the lever (90) and of the drive shaft (35) to the arc of circumference subtended by the commutation angle, between a first position and a second position defined by the first stop hole (79) and a second stop hole (79a).

According to the preferred embodiment of the invention, the lock system (93) comprises a telescopic pin (931), for example provided with an empty cylindrical body (933), wherein a compression spring (935) is inserted, an a button element (937). The button element (937) is slidingly joined with the empty cylindrical body (933) in contrast with the elastic force of the compression end (935). Moreover, the body (31) comprises a through hole (313) formed in coaxial position to the first stop hole (79), which corresponds to the first position of the lever (90) (new) The chlorine dioxide solution generating of telescopic pin (931) is coupled with the pair of plate-like bodies of the lever (90) in such a way to be coaxial to the first stop hole (79) and to the through hole (313) of the body (31) with the lever (90) in the first position, so that the button element (937) can penetrate the first stop hole (79) and the through hole (313) and protrude beyond the body (31) when the lever (90) is in the first position, as shown in FIG. 6.

The lever (90) also comprises an engagement pin (95) that protrudes in transverse position from the body of the lever (90). The engagement pin (95) is disposed in opposition position to the first end of the lever (90) relative to the drive shaft (35) and engages the drive mechanism (80), as successively described.

The fixing mechanism (70) comprises a spring (100), for example a helical spring, which is coupled with the guide plate (77) by means of a first end and with the slide (75) by means of a second end. The position of the spring (100) is such that the spring (100) exerts a return force that tends to move the slide (75) away from the support surface (S).

Figure 9:
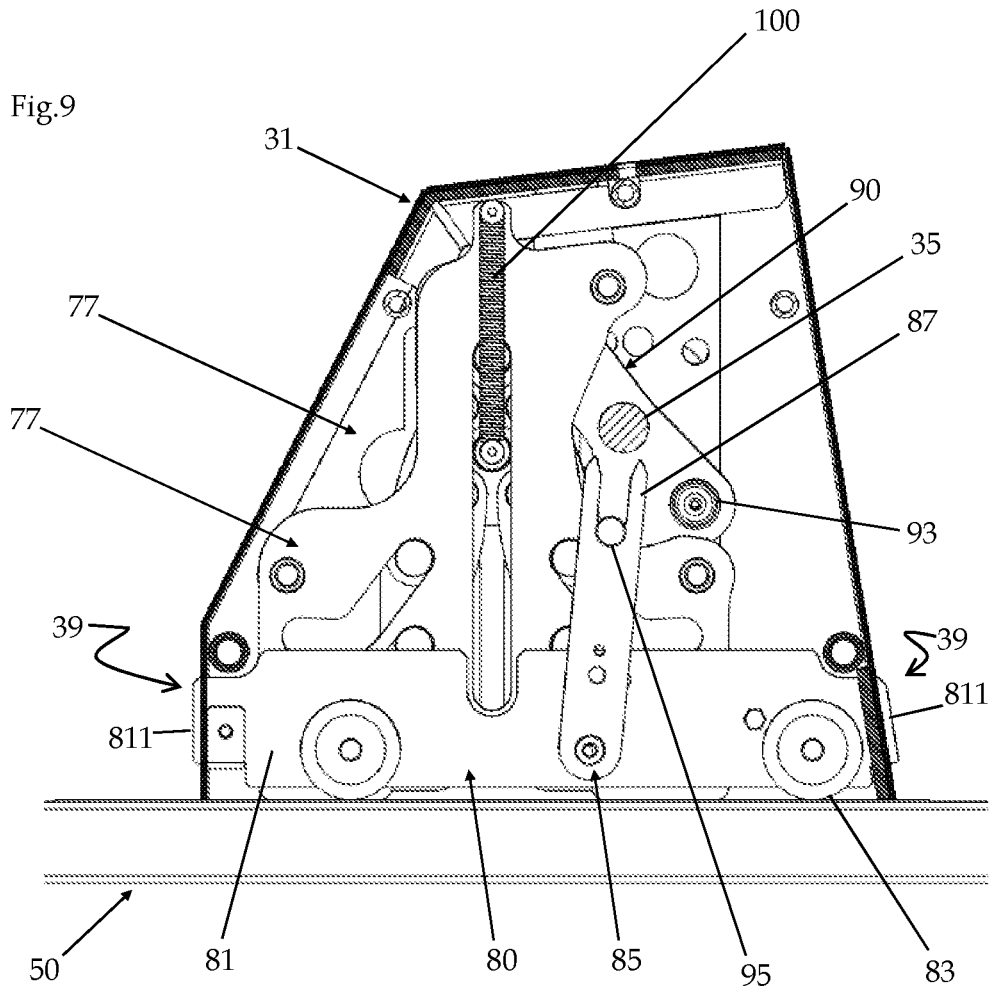
FIG. 9 is a side view of the sliding support in such a configuration to let the mobile frame slide.

With reference to FIG. 9, the drive mechanism (80) comprises a bearing plate (81) that comprises an elongated body with two opposite ends (811) suitable for being inserted in corresponding grooves (39) formed in opposite walls of the body (31) in the proximity of the supporting edge (311). The bearing plate (81) is substantially parallel to the guide plate (77) of the fixing mechanism (70).

Two wheels (83) are hinged to the bearing plate (81) in order to let the bearing plate (81) move. The number of wheels is not essential and in alternative embodiments a single wheel or more than two wheels can be provided for each bearing plate (81).

The drive mechanism (80) also comprises an actuation element (85), which comprises a plate-like elongated body fixed to the bearing plate (81) by means of a first end, whereas it comprises a fork (87) at a second free end opposite to the first end.

The fork (87) is suitable for receiving the engagement pin (95) of the lever (90) in order to move the drive mechanism (80) from an idle configuration, wherein it is uncoupled from the lever (90), to an active configuration, wherein it is constrained to the lever (90) and the wheels (83) support at least partially the weight of the mobile frame (30) on the support surface (S).

In the example of FIGS. 5-10, the upper portion of the bodies (31) is provided with fixing housing (315) where two seats (13) are fixed. Alternatively, the mobile frame (30) may also comprise a fixing bar in transverse position relative to the bodies (31) where the pair of back seats (13) is mounted.

In order to constrain the mobile frame (30) to the support surface (S), the system (1) comprises a first housing element (40A) and a second housing element (40B) that are suitable for being engaged by the mobile frame (30).

As shown in FIGS. 11 and 12, the two housing elements (40A and 40B) comprise bodies (41) provided with a shaped end (43A, 43B) suitable for corresponding to the shaped end of the other body (41).

In the example, the end (43B) of the second housing element (40B) protrudes from the body (41) in such a way to rest on a support surface (430A) of the shaped end (43A) of the first housing element (40A).

Each shaped end (43A, 43B) is provided with a through hole (431A, 431B) that is suitable for housing a removable fixing element, such as a nut (432), that is a screw without protruding head. In view of the above, as shown in FIG. 11, the two housing elements (40A, 40B) can be connected by matching the two shaped ends and by fixing the nut (432).

In the example of FIGS. 11 and 12, the bodies (41A, 41B) of the two housing elements (40A, 40B) have a base (411A, 411B) that is larger than an upper surface (412A, 412B) that acts as support surface for the seats. In this embodiment of the invention, the base (411A, 411B) of the bodies (41A, 41B) has an overturned T-shaped lateral section. Consequently, the bodies (41A, 41B) of the housing elements can act as guides where the seats can be slidingly fixed.

Moreover, each body (41A, 41B) comprises an opening (45A, 45B), for example a through hole, which is defined by a wall with a fixing projection (47A, 47B) suitable for being engaged by a fixing element (71). In particular, the fixing projection (47) is disposed in distal position relative to the shaped end (43A,43B), and is suitable for being received in the concavity of the hook end (711) of a fixing element (71) of the fixing mechanism (70).

Accordingly, as shown in FIG. 11, when the two housing elements (40A and 40B) are coupled, the walls that define the openings (45) are formed in such a way to be provided with fixing projections (47A, 47B) in opposite position.

In the example, two pairs of housing elements (40A, 40B) in coupled mode are fixed to constraint bars (50) of the system (1), or alternatively in the support surface (S), in such a way to be substantially flush with the support surface (S).

In particular, the system comprises a pair of constraint bars (50), as shown in FIGS. 3 and 4.

The constraint bars (50) are disposed on the support surface (S) or are preferably inserted in the support surface (S).

The constraint bars (50) are disposed in parallel distal position in such a way to receive the support elements (21) of the fixed frame (20) and corresponding pairs of housing elements (40A, 40B) for coupling with the mobile frame (30).

In the example, the constraint bars (50) have a substantially C-shaped cross-section with inward-bent free ends, as shown in FIG. 12. The constraint bars (30) are directed in such a way that an opening (51) of the constraint bars (30) is exposed on the support surface (S) and substantially flush with the support surface (S), if the constraint bars (50) are inserted in the support surface (S).

The housing elements (40A, 40B) arc suitable for being received in the space defined by a corresponding constraint bar (50) and, preferably, can be fixed in a desired position by means of fixing means, such as two nuts (435) in the example, and preferably also by means of the nut (432) used to mutually fix the housing elements (40A, 40B). Specifically, the housing elements (40A, 40B) comprise threaded through holes (401A, 401B), each of them being suitable for receiving a nut (435). When the housing elements (40A, 40B) are disposed in the desired position in the constraint bar (50), the nuts (435) are tightened in the through holes (401A, 401B), and the nut (432) is tightened in the through holes (431A, 431B) until one end stops against a base of the constraint bar (50), in opposite position to the opening (51) relative to the longitudinal direction (L), and compresses the bases (411A, 411B) of the bodies (41A, 41B) against the free ends of the constraint bar (50). Consequently, the housing elements (40A, 40B) are tightened to the constraint bar (50) in the desired position, whereas the upper surfaces (412A, 412B) are exposed through the opening (51), as shown in FIG. 13.

Alternatively, the constraint bars (50) may comprise holes suitable for receiving the fixing elements (41) in such a way to fix the housing elements (40A, 40B) along the constraint bars (50) in preset anchoring positions.

Advantageously, the system (1) also comprises a guide assembly (60) suitable for guiding the movement of the mobile frame (30) from the operating position to the compact position.

As shown in FIGS. 3 and 4, the guide assembly (60) comprises a rod (61) that is laterally coupled with the mobile frame (30) in such a way to be substantially parallel to the support surface (S) and, consequently, to the moving direction of the mobile frame (30). Alternatively, the guide assembly (60) may be coupled with the pair of back seats (13), the rod (61) being mounted in such a way to be parallel to the moving direction of the mobile frame (30).

The guide assembly (60) comprises a sleeve (63) that is laterally coupled with the fixed frame (20) or to the pair of front seats (11) in the aforementioned embodiment. The sleeve (63) is suitable for slidingly receiving the rod (61).

Operatively, in order to firmly hold the mobile frame (30) in a preset position, the anchoring element (33) is disposed in an anchored configuration.

As shown in FIG. 7, in the anchored configuration, the lever (90) is brought to the first position where it holds the fixing mechanism (70) in the anchored configuration, with the slide (75) at a first end of the first guide groove (771) in proximal position relative to the supporting edge (311) of the body (31).

Moreover, the lock element (93) of the lever (90) engages a first stop hole (79) on the guide plate (77). In particular, the button element (937) penetrates the first stop hole (79) and the through hole (313) on the body (31) in such a way to protrude from the body (31) and lock the lever (90) in the first position and the fixing mechanism (70) in the anchored position, as shown in FIG. 10.

The articulation arms (73) are in extended position so that the fixing elements (71) are disposed at the ends of the second guide grooves (773) in proximal position relative to the supporting edge (311).

In the extended position, the hook ends (711) of the fixing elements (71) protrude beyond the supporting edge (311) towards the support surface (S) and engage relative housing elements (40A, 40B), the hook ends (711) being at least partially inserted in the openings (45) of said housing elements and being engaged with the projections (47A, 47B) of the walls the define the receptacle (45).

Moreover, in this position, the spring (100) is extended.

At the same time, as shown in FIGS. 5 and 6, the engagement pin (95) is released from the fork (87) of the sliding mechanism (80).

When the seats (13) mounted on the mobile frame (20) are to be moved, the anchoring element (33) is brought to a non-anchored configuration, as shown in FIG. 8, wherein the mobile frame (30) is released from the housing elements (40A, 40B).

In the non-anchored configuration, the lever (90) is in the second position where it holds the fixing mechanism (70) in the non-anchored configuration, with the slide (75) at a second end of the first guide groove (711) in distal position relative to the supporting edge (311) of the body (31).

In such a configuration, the lock system (93) engages a second stop hole (79a) on the guide plate (77), and consequently the articulation arms (73) are folded and substantially perpendicular to the support surface (S) (new) The chlorine dioxide solution generating of anchoring element (33) disposes the fixing elements (71) at the ends of the second guides (773) in distal position relative to the supporting edge (311) Interior 16 of such a position. the hook ends (711) of the fixing means (71) are retracted inside the body (31) and, consequently, do not engage the housing elements (40A, 40B). In such a configuration, the spring (100) is idle.

At the same time, as shown in FIG. 9, the engagement pin (95) is received by the fork (87) of the actuation element (85) of the sliding mechanism (80).

Because of such a constraint, the lever (90) exerts a force on the bearing plate (81) of the sliding mechanism (80), said force being directed towards the support surface (S).

Consequently, the wheels (83) are maintained in contact with the support surface (S) and support the weight of the mobile frame (30) and of the pair of back seats (13), at least partially.

Preferably, the frame (30) and the pair of back seats (13) are moved away from the support surface (S) when the lever (90) pushes the bearing plate (81) and consequently the wheels (83) towards the support surface (S).

In such a configuration, the mobile frame (30) and the pair of back seats (13) can be moved because of the rolling of the wheels (83) on the support surface (S).

In order to move the anchoring element (33) from the anchored configuration to the non-anchored configuration, the operator will press the button element (937) of the telescopic pin (931), inserting the button element (937) in the empty cylindrical body (933) at least partially, in such a way to release the lever (90) and consequently the fixing mechanism (70). Then, the operator will rotate the crank (37) in a first direction by an angle that is equal to the commutation angle, causing the actuation of the fixing mechanism (70) and the release of the fixing elements (71) from the housing elements (40A, 40B). Following to such a release, the fixing elements (71) are retracted inside the body (31) because of the return of the spring (100) that acts on the slide (75).

Moreover, the rotation of the crank (37) brings the engagement pin (95) in the fork (87). Consequently, the drive mechanism (80) is in the active configuration, and the wheels (83) are compressed onto the support surface (S) by the lever (90).

Therefore, the operator can bring the seats of the pair of back seats (13) in the closed position and push the assembly composed of the mobile frame (30) and of the pair of back seats (13) towards the pair of front seats (11), making the wheels (83) roll on the support surface (S) or on a border of the constraint bars (50). Obviously, if the back seats are already disposed near the front seats, after rotating the crank (47) and releasing the fixing elements (71), the back seats (13) can be moved away from the front seats (11).

The sliding coupling of the rod (61) and of the sleeve (63) keeps the assembly formed of the mobile frame (30) and of the pair of back seats (13) in aligned position relative to the assembly formed of the fixed frame (20) and the pair of front seats (10) during the movement of the former towards the latter, or away from the latter.

When the system (1) has reached the desired position, the crank (37) can be rotated again in opposite direction in order to bring the anchoring element (33) back to the anchored configuration.

The fixing elements (71) of the fixing mechanism (70) are lowered under the body (31) and brought to such a position to engage the housing elements (40A, 40B) fixed to the constraint bars (50), in such a way to constrain again the assembly formed of the mobile frame (30) and the pair of back seats (13) to the support surface (S) in the anchored configuration of the system (1).

For each stable operating position, the system (1) comprises two pairs of housing elements (40A, 40B) where the fixing elements (71) can be fixed. The number of stable operating positions can vary from a minimum of one position to an indefinite number, which can be higher than two.

By using the system (1), the internal space of a vehicle can be rearranged as desired. In view of the above, if necessary, the loading space of the vehicle can be increased and/or a suitable standing and maneuvering space can be provided for users with walking aids (such as, for instance, wheelchairs). Moreover, it also increases the number of available seats.

Numerous equivalent variations and modifications can be made to the present embodiments of the invention, which are within the reach of an expert of the field, falling in any case within the scope of the invention.

For instance, a mobile frame (30) with a different number of bodies (31) and anchoring elements (33) can be provided, for instance only one body (31) and anchoring element (33) assembly, or three bodies (31) and anchoring elements (33) in parallel position.

According to an alternative embodiment, the anchoring assembly (33) may comprise an actuation element other than a crank, for example an electric motor.

According to an alternative embodiment, the sliding mechanism (80) may comprise a slide, instead of wheels.

According to an additional embodiment, the two guide plates that are used to guide the slide may be made in a one piece, for example through a sequence of punching and bending operations of a sheet metal.

According to a different embodiment, the housing elements may comprise a cavity suitable for receiving the hook ends (711) of the fixing elements (71) instead of through holes.

Moreover, instead of providing housing elements (40A, 40B), housings can be obtained in preset positions directly in the support surface (S), which are suitable for receiving the fixing elements (71) to constrain the mobile frame (30). If present, the housing elements (40A, 40B) may have a different shape from the ones represented in FIGS. 10 and 11. Moreover, instead of having two housing elements that are mutually fixed, a single housing element may be provided with two openings where the fixing elements (71) of the fixing mechanism are fixed.

Furthermore, the rod (61) of the guide assembly (61) may be coupled with the pair of front seats (11) and the sleeve (63) may be coupled with the pair of back seats (13).

According to a different embodiment, the guide rod (61) may be coupled with an actuator, for example a linear actuator, in such a way to automatically move the mobile frame (30) from the first position to the second position and vice versa, when in the non-anchored configuration.

According to another embodiment, the body (31) of the mobile frame (30) may comprise a through hole (313) in each stop, so that the operator must press the button element (937) to permit the rotation of the lever (90) from the second position to the first position in order to bring the fixing mechanism (70) from the non-anchored configuration to the anchored configuration.

Alternatively, the one or two stop holes (79 or 79a) are closed and comprise a shaped bottom, such as an inclined bottom or a bottom shaped like a sphere of segment, in such a way to release the lever (90) in the corresponding position by simply applying the necessary force to the crank (37).

According to an alternative embodiment, the system (1) may also comprise a safety device suitable for locking the anchoring assembly (33), in such a way to prevent a rotation of the lever (90) and, eventually, of the seat of the pair of back seats (13). According to an embodiment of the invention, the safety assembly comprise a lock/release lever that can be pulled in order to actuate a mechanism (not shown) that locks/unlocks the button element (937) of the telescopic pin (931) of the locking system (93) and/or the lever (90) of the anchoring element (33). The lock/unlock lever may be positioned on a lateral wall of the backrest of a seat (10) of the pair of back seats (13). Advantageously, a lock is associated to the lever (90) to fix the lever (90) to the seat (10), in such a way to limit the intervention to operators provided with a key.

We claim:

1. A mobile frame for at least one seat, the mobile frame comprising:
   a load-bearing structure adapted to support the at least one seat on a support surface;
   an anchoring element coupled to said load-bearing structure and adapted to selectively constrain the mobile frame to the support surface, said anchoring element comprising:
   a fixing mechanism that has a non-anchored configuration and an anchored configuration, said fixing mechanism having at least one fixing element retracted inside said load-bearing structure while in the anchored configuration, wherein the at least one fixing element protrudes beyond said load-bearing structure so as to constrain the mobile frame to the support surface, said fixing mechanism comprising a slide articulatedly coupled with the at least one fixing element and at least one guide plate having a first guide groove and a second guide groove, the slide and the at least one fixing element being respectively slidable in the first guide groove and the second guide groove such that a sliding movement of the slide along the first guide groove causes the at least one fixing element to slide along the second guide groove so as to cause said fixing mechanism to move between the anchored configuration to the non-anchored configuration.

2. The mobile frame of claim 1, wherein the first guide groove extends along a longitudinal axis of the mobile frame transverse to the support surface, wherein the second guide groove has a second end away from the first guide groove and adjacent to the support surface, wherein the first guide groove has a second end that is adjacent to the first guide groove and away from the support surface, said fixing mechanism being in the non-anchored configuration when the at least one fixing element is disposed in the second end of the second guide groove, said fixing element being in the anchored configuration when the at least one fixing element is disposed in the first end of the second guide groove.

3. The mobile frame of claim 2, further comprising:
an actuation lever coupled to the slide and rotatable between a first position and a second position so as to cause the slide to slide along the first guide groove between a first end thereof and a second end thereof, the first end of the first guide groove being proximal to the support surface, the second end of the first guide groove being distal from the support surface.

4. The mobile frame of claim 3, further comprising:
a body having a through hole, wherein said actuation lever has a lock system with a telescopic pin, the telescopic pin engaging the through hole of said body so as to lock said actuation lever in one of the first position and the second position.

5. The mobile frame of claim 3, further comprising:
a moving mechanism having at least one sliding element movable between an idle configuration and an active configuration, said moving mechanism comprising an actuation element with a fork, the fork receiving the engagement pin of said actuation lever when the moving mechanism is in the active configuration, an engagement pin being uncoupled from the fork when the moving mechanism is in the idle configuration.

6. The mobile frame of claim 1, further comprising:
a moving mechanism having at least one sliding element movable between an idle configuration and an active configuration, the at least one sliding element adapted to contact the support surface so as to at least partially support a weight of the mobile frame while sliding on the support surface.

7. The mobile frame of claim 1, wherein the at least one fixing element has a hook end with concave portions facing opposite directions.

8. The mobile frame of claim 1, wherein the support surface has a first support surface and a second support surface, wherein said anchoring element comprises a first anchoring element and a second anchoring element, the second anchoring element is coupled by a drive shaft to the second anchoring element.

* * * * *